Patented Mar. 2, 1937

2,072,618

UNITED STATES PATENT OFFICE 2,072,618

PRODUCTION OF AMINES

Miles A. Dahlen, Wilmington, Del., and William L. Foohey, Penns Grove, N. J., assignors to E. I. du Pont de Nemours & Company, Wilmington, Del., a corporation of Delaware No Drawing. Application May 26, 1933, Serial No. 673,102

13 Claims. (Cl. 260—130.5)

This invention relates to arylamines, more particularly nitro-arylamines, and a process for the production thereof.

It is known that various arylamines may be produced by the reaction of ammonia with the halogen of an aryl halide. The manufacture of para-nitraniline on a large scale by such a process is widely practised. The usual operating procedure is similar to the following:

A steel autoclave, fitted with an efficient agitator, is charged with strong aqueous ammonia and para-nitro-chlorobenzene. The mass is heated under pressure for the required period of time at a suitable temperature, resulting in conversion of much or all of the para-nitrochlorobenzene to para-nitraniline. The mass is then cooled, the pressure released, the excess ammonia and any unchanged para-nitro-chlorobenzene removed by steam-distillation, the charge cooled further, and the insoluble crude para-nitraniline separated by filtration. The crude product is then purified by a suitable procedure, such as crystallization from water or an organic solvent, distillation with super-heated steam, or sublimation.

It is well known that the crude product obtained by such a process is usually dark in color and contains considerable quantities of iron in the form of oxide, hydroxide, salts, or complex metallo-organic compounds. Considerable difficulty is experienced in purifying the crude material to yield a product of the quality required in the manufacture of dyes and pigments, it being especially difficult to remove all of the iron salts or complexes. Further, as shown by the accumulation of iron in the product, such amination processes result in destructive corrosion of the equipment used in its manufacture, obviously a serious problem to the manufacturer.

With a view to avoiding difficulties of the character above described, it is an object of the present invention to provide a new and improved process for producing arylamines by the reaction of ammonia with the halogen of an aryl halide in vessels constructed of materials subject to iron corrosion under the conditions of reaction. A further object is the provision of a new and improved process for the production of mono- or poly-nitro-arylamines. A still further object is the production of products of the character above described directly in a relatively high state of purity. An additional object is the production of products of the character above described in high yields. Other objects will appear hereinafter.

These objects are accomplished according to this invention whereby, in the production of primary arylamines by the reaction of ammonia with the halogen of an aryl halide in a vessel in which the part in contact with the reaction mixture is constructed of a material subject to iron corrosion, the process is characterized by the improvement that an agent which inhibits the attack of iron by the reaction mixture is added to the reaction zone, preferably in a small amount.

The invention will be further understood, but is not limited, by the following examples, in which the parts are by weight.

Example I

One hundred fifty-seven and five-tenths parts of para-nitro-chlorobenzene, 986 parts of aqueous ammonia of 28% strength and 3 parts of pyridine were charged into a steel autoclave equipped with an efficient agitator and heating and cooling devices. The mass was heated, with agitation, to 165° C. to 170° C. (pressure usually 500 to 700 pounds per square inch) and held at this temperature for twenty hours. It was then cooled to 100° C., and the pressure released slowly through an ammonia recovery system. The mass was then steam-distilled until most or all of the ammonia and any unchanged para-nitrochlorobenzene had been removed. It was then cooled to 20° C., and the precipitated paranitraniline separated by filtration. The product was washed with a little water to remove adhering mother liquor.

The product thus obtained was yellow in color and contained only very small quantities of iron in the form of oxide, hydroxide or organic complexes. There was little or no corrosion of the reaction vessel. When the same process was carried out except that the addition of pyridine was omitted, the product was brown in color and contained relatively large quantities of iron. Furthermore, the reaction vessel was corroded to a much greater degree.

If desirable, the product obtained according to the above process may be further purified; suitably by dissolving in water under pressure at about 130° C., clarifying by filtration, and cooling the filtrate to crystallize the purified product. It may also be purified by crystallization from an organic solvent such as ethyl alcohol, benzene or toluene; by sublimation; or by distillation with superheated steam.

Example II

The process of Example I was repeated except that the three parts of pyridine were replaced by three parts of technical "high-boiling pyridine" (boiling range 115° C. to 140° C.). This high-boiling pyridine consists chiefly of pyridine, picolines and dimethyl pyridines. Similar improved results were obtained.

Example III

The process of Example I was repeated except that the three parts of pyridine were replaced by three parts of dimethyl-aniline. Similar improved results were obtained.

Example IV

The process of Example I was repeated except that 157.5 parts of ortho-nitro-chlorobenzene were substituted for the 157.5 parts of para-nitrochlorobenzene. Following the same procedure as in Example I, ortho-nitraniline was obtained in excellent yield and quality, the product being of much improved appearance and containing much less iron than that obtained in the absence of the pyridine. Likewise, the corrosion of the steel autoclave was reduced to a minimum.

Example V

One hundred ninety-two parts of 2:5-dichloronitrobenzene, 486 parts of aqueous ammonia of 28% strength, and 2 parts of pyridine were charged into an iron autoclave, and the mass heated under pressure for twelve hours at 160° C. to 170° C. The mass was then cooled to 20° C., and the precipitated 4-chloro-2-nitraniline separated by filtration. The excess ammonia was recovered from the filtrate.

The product obtained as above was of high purity, excellent appearance, and contained very little iron. The iron autoclave suffered little, if any, corrosion. In the absence of the pyridine, the corrosion of the reaction vessel occurred to a much greater degree and the product was much inferior in quality.

If desirable, the product obtained by the above process may be purified by crystallization from alcohol, toluene, or other suitable solvent.

Example VI

An iron autoclave was charged with 70 parts of water, 2 parts of quinoline, 116 parts of 2:4-dinitro-chlorobenzene and 196 parts of aqueous ammonia of 25% strength. The mass was heated slowly to 125° C., and then held at 125° C. to 130° C. for ten hours, with continuous agitation. The gauge pressure was usually 80 to 90 pounds per square inch.

The charge was cooled to 100° C., then stirred into 350 parts of water. The mass was cooled, with agitation, to 10° C. to 20° C., then filtered. The product, 2:4-dinitro-aniline, was washed with enough water to displace the mother liquors. The yield was about 95% of the theoretical amount.

The product was light in color, contained very little iron, and was suitable for use in dye manufacture of other processes without further purification. The corrosion of the iron autoclave was very much less than that occurring when quinoline was not used.

Example VII

An iron autoclave was charged with 3300 parts of water, 1200 parts of 4-nitro-chlorobenzene-2-sulfonic-acid, 261 parts of anhydrous ammonia, 100 parts of sodium carbonate and 10 parts of monoethyl-ortho-toluidine. The reaction mass was heated slowly, with agitation, to 140° C., and held at this temperature for ten hours. A pressure of about 60 pounds per square inch developed.

The charge was then cooled to 100° C., and the ammonia pressure released through an absorption system. The mass was then diluted with 5000 parts of water, filtered while hot to remove insoluble matter, and the filtrate collected in a wooden tub. Eight hundred to 1000 parts of common salt were added, the mass cooled to 20° C., and the crystallized sodium salt of para-nitraniline-ortho-sulfonic-acid separated by filtration. The adhering mother liquor was removed by washing the filter cake with a little water. The product was then suitable for use in the manufacture of dyes and other products, without further purification. A yield of 85% of the theory was obtained.

In carrying out the amination process as above, little, if any, corrosion of the iron vessel took place. However, when the addition of monoethyl-ortho-toluidine was not made, considerable quantities of iron were found in the finished reaction mass, indicating serious corrosion.

Similarly, improved results may be obtained in carrying out the following amination reactions in vessels subject to iron corrosion:

| Aryl halide | Arylamine |
| --- | --- |
| 4-nitro-1-chloronaphthalene | 4-nitro-1-naphthylamine |
| 3-methoxy-4-nitro-chlorobenzene | 3-methoxy-4-nitraniline |
| 3-nitro-4-chlorodiphenyl | 3-nitro-4-aminodiphenyl |
| 2-nitrochlorobenzene-4-sulfonic-acid | 2-nitroaniline-4-sulfonic-acid |
| 2-nitro-1:4-dibromobenzene | 2-nitro-4-bromoaniline |
| 3-nitro-4-chlorotoluene | 3-nitro-4-aminotoluene |
| 2:4-dinitrochlorobenzene-6-sulfonic-acid | 2:4-dinitraniline-6-sulfonic-acid |
| 2:4:6-trinitrochlorobenzene | 2:4:6-trinitraniline |

As is known, unless the halogen to be removed from the aryl nucleus is present in one of the reactive positions, i. e., the ortho and para position, with relation to an activating substituent such as the nitro group, the amination process is not readily effected.

The usual methods of amination may be employed, involving the use of aqueous or anhydrous ammonia with or without an auxiliary acid-binding agent such as, for example, sodium carbonate, sodium bicarbonate or other mild inorganic base.

The invention is considered to have a general application to amination reactions of the character described when carried out in vessels in which the part in contact with the reaction mixture is subject to iron corrosion. While the invention is not limited to any theory, it is believed that the corrosive action of the reaction mixture is caused by the ammonium halide formed during the reaction. Therefore, compounds which inhibit corrosion of iron by ammoniacal ammonium halides should be effective. Secondary and tertiary arylamines, aralkylamines, alkyl-arylamines, and heterocyclic amines have been found to be especially efficient inhibitors of the iron corrosive effects of these amination processes. However, a large number of other materials have also been found to be effective in inhibiting the attack of the amination reaction mixtures on iron vessels. In general, the substances preferably used do not readily enter into reaction with the ammonia, aryl halide, aryl amine or other constituents of the reaction mass. Among the specific compounds which have been found to be especially effective, in addition to those given in the examples, the following may be mentioned:

Dibenzylaniline, diethyl-alpha-naphthylamine, monoethyl-meta-toluidine, dimethyl-meta-toluidine, iso-quinoline, monoethylaniline, thiocarbanilide, diphenyl-guanidine, di-orhto-tolyl-guanidine, diphenylamine.

A condensation product of aniline, acetaldehyde and carbon-bisulfide has also been found effective. Particularly advantageous results have been obtained in the use of heterocyclic amines such as, for example, pyridine and quinoline. The preferred inhibitors are at least partially soluble in the ammoniacal reaction liquor.

The amount of the inhibitor employed is subject to variation but, in general, should be relatively small as compared with the proportions of the reacting materials. Usually about one to about ten parts per 1000 parts of reaction mixture will be found to be satisfactory.

Many of the products of the invention are important intermediates in the manufacture of dyes, color pigments and similar products. As a result of the invention, these products may be manufactured in better quality than has been possible when the aminations are carried out according to prior art methods. Since the crude products obtained directly from the amination mass are of much improved quality, the preparation of chemically pure materials by purification of such crude products is much more readily effected with obvious economies in the cost of producing such materials. Furthermore, the corrosive action of the reaction mixture on the equipment, encountered when carrying out the aminations according to the older methods, may be reduced to a minimum by the application of the present invention.

As many apparently widely different embodiments of this invention may be made without departing from the spirit and scope thereof, it is to be understood that we do not limit ourselves to the specific embodiments thereof except as described in the following claims.

We claim:

1. In a process of producing para-nitraniline by the reaction of ammonia with the chlorine of para-nitrochlorobenzene in a vessel subject to iron corrosion, the improvement which comprises adding about 1 to about 10 parts of pyridine per thousand parts of reaction mixture to the reaction zone.

2. The process of producing para-nitraniline which comprises heating together in a closed steel vessel at a temperature of about 165° C. to about 170° C., with agitation, para-nitrochlorobenzene, ammonia and water in suitable proportions for amination, in the presence of about 1 to about 10 parts of pyridine per thousand parts of reaction mixture.

3. The process of producing para-nitraniline which comprises heating together in a closed steel vessel at a temperature of about 165° C. to about 170° C., with agitation, about 157.5 parts of para-nitrochlorobenzene, about 986 parts of about 28% aqueous ammonia and about 3 parts of pyridine.

4. The process of producing a primary nitroarylamine which comprises heating together ammonia, water and a nitro-aryl halide in which at least one halogen atom is present in a reactive position, under amination conditions in a vessel which is normally subject to iron corrosion, and carrying out the reaction in the presence of about 1 to about 10 parts of a tertiary heterocyclic amine per thousand parts of reaction mixture.

5. The process of producing a primary nitroarylamine which comprises heating together ammonia, water and a nitro-aryl halide in which at least one halogen atom is present in a reactive position, under amination conditions in a vessel which is normally subject to iron corrosion, and carrying out the reaction in the presence of about 1 to about 10 parts of a secondary arylamine per thousand parts of reaction mixture.

6. In a process of producing a primary aromatic amine by the reaction of ammonia with a ring halogen atom of an aromatic halide in a vessel in which that part in contact with the reaction mixture is subject to iron corrosion, the improvement which comprises adding to the reaction mixture an inhibitor effective in inhibiting the attack of iron by an ammoniacal ammonium halide, said inhibitor being a cyclic nitrogen compound containing an ammonia nitrogen atom directly connected to from two to three carbon atoms at least one of which is a carbon of a six-membered ring the members of which, other than the ammonia nitrogen when this is a member of the ring, are carbon.

7. The process of claim 6 in which the nitro-aryl halide is a nitro-aryl halide of the benzene series.

8. The process of claim 6 in which the inhibitor is soluble in the ammoniacal reaction liquid.

9. The process of producing a primary nitro arylamine which comprises heating together ammonia, water and a nitroaryl halide in which at least one halogen atom is present in a reactive position, under amination conditions in a vessel which is normally subject to iron corrosion and carrying out the reaction in the presence of about one to about ten parts, per thousand parts of reaction mixture, of a member of the class consisting of tertiary heterocyclic and aromatic amines and secondary arylamines.

10. The process of producing a primary nitro arylamine by reacting together ammonia and a nitroaryl halide in which at least one halogen atom and at least one nitro group is present in a reactive position, in a vessed which is subject to iron corrosion, and carrying out the reaction in the presence of an inhibitor effective in inhibiting the attack of iron by an ammoniacal ammonium halide, said inhibitor being a cyclic nitrogen compound containing an ammonia nitrogen atom directly connected to from two to three carbon atoms at least one of which is a carbon of a six-membered ring the members of which, other than the ammonia nitrogen when this is a member of the ring, are carbon.

11. The process of producing para-nitraniline which comprises heating together ammonia, water and para-nitrochlorobenzene under amination conditions in a vessel which is subject to iron corrosion, in the presence of an inhibitor effective in inhibiting the attack of iron by an ammoniacal ammonium halide, said inhibitor being a cyclic nitrogen compound containing an ammonia nitrogen atom directly connected to from two to three carbon atoms at least one of which is a carbon of a six-membered ring the members of which, other than the ammonia nitrogen when this is a member of the ring, are carbon.

12. The process of producing a primary nitro arylamine by reacting together ammonia and a nitro-aryl halide in which at least one halogen atom and at least one nitro group is present in a reactive position, in a vessel which is subject to iron corrosion, and carrying out the reaction in the presence of an inhibitor effective in inhibiting the attack of iron by an ammoniacal ammonium halide, said inhibitor being a condensation product of aniline, acetaldehyde and carbon bisulfide.

13. The process of producing para-nitraniline which comprises heating together ammonia, water and para-nitrochlorobenzene under amination conditions in a vessel which is subject to iron corrosion, in the presence of an inhibitor effective in inhibiting the attack of iron by an ammoniacal ammonium halide, said inhibitor being a condensation product of aniline, acetaldehyde and carbon bisulfide.

MILES A. DAHLEN.
WILLIAM L. FOOHEY.